United States Patent [19]

Gerber

[11] Patent Number: 6,046,252
[45] Date of Patent: *Apr. 4, 2000

[54] CURATIVES FOR PHENOLIC NOVOLACS

[75] Inventor: Arthur H. Gerber, Louisville, Ky.

[73] Assignee: Borden Chemical, Inc., Columbus, Ohio

[*] Notice: This patent is subject to a terminal disclaimer.

[21] Appl. No.: 08/806,148

[22] Filed: Feb. 25, 1997

Related U.S. Application Data

[62] Division of application No. 08/225,890, Apr. 11, 1994, Pat. No. 5,648,404.

[51] Int. Cl.$^7$ ............................... B22C 1/10; B22C 1/00
[52] U.S. Cl. .................... 523/145; 523/139; 523/147; 524/192; 524/593; 524/594; 528/129; 528/139; 528/144; 528/145; 528/147; 525/480; 525/504
[58] Field of Search ................... 523/145, 147, 523/139; 524/593, 594, 192; 528/129, 139, 144, 145, 147; 525/480, 504

[56] References Cited

U.S. PATENT DOCUMENTS

| | | | |
|---|---|---|---|
| 4,022,739 | 5/1977 | Boue | 523/140 |
| 4,072,531 | 2/1978 | Funabiki et al. | 106/56 |
| 4,082,718 | 4/1978 | Ando et al. | 523/140 |
| 4,256,622 | 3/1981 | Smith | 524/376 |
| 4,379,866 | 4/1983 | Henry, Jr. et al. | 523/140 |
| 4,381,355 | 4/1983 | Henry, Jr. et al. | 523/140 |
| 4,775,455 | 10/1988 | Chandramouli et al. | 204/294 |
| 4,897,170 | 1/1990 | Chandromouli | 204/294 |
| 5,281,644 | 1/1994 | Iyer et al. | 524/259 |
| 5,686,506 | 11/1997 | Gerber | 523/139 |

FOREIGN PATENT DOCUMENTS

| | | |
|---|---|---|
| 0469786 | 7/1991 | European Pat. Off. . |
| 0469811 | 7/1991 | European Pat. Off. . |
| 0104918 | 6/1983 | Japan . |

OTHER PUBLICATIONS

American Cyanamid Company, "High Solids Amino Crosslinking Agents" CRT 11/91–5K.

American Cyanamid Company, "Compositional Guide to High Solids Melamine Formaldehyde Cross–Linking Agents" 4–2109 Feb. 1984 7/86–3K.

Monsanto Chemical Co. "Resimine Amino Crosslinker Resins" MCRE–2016, 1991.

M.R. Winkle and K.A. Graziano, "Acid Hardening Positive Photoresist Using Photochemical Generation of Base", J. Photopolym. Sci. and Technol., vol. 3, No. 3 (1990) pp. 419–422.

K.A. Graziano, S.D. Thompson, and M.R. Winkle, "Novel Acid–Hardening Positive Photoresist Technology", SPIE, vol. 1466, Advances in Resist Technology and Processing VIII (1991), pp. 75–88.

K.A. Graziano, et al., "Acid Catalyzed Crosslinking In Novolak Based Negative Resists", Polym. Mater. Sci. Eng., 60, 151–4 (Eng) 1989.

J.W. Thackaray et al, "DUV ANR Photoresists: Resist Design Considerations", J. Photopolym. Sci and Technol., vol. 3, No. 3, 1990, pp. 401–415.

Foseco, Inc. "Tuncast Tundish Spray System", 1990, 3M/1190.

S. Carniglia and G. Barona, "Handbook of Industrial Refractories Technology", pp. 567–572, Noyes Publications (1992).

*Primary Examiner*—Marion McCamish
*Assistant Examiner*—John J. Guarriello
*Attorney, Agent, or Firm*—Stevens, Davis, Miller & Mosher, L.L.P.

[57] ABSTRACT

A binder composition of a phenolic novolac resin and a (lower) alkoxylated triazine-formaldehyde resin curing agent is disclosed. The triazine resins have sufficient carbon atoms in the alkoxy groups so as to provide a curing agent having a water solubility of less than 15%. The binder cures at high temperatures so as to provide improved flow and prolonged workability to the composition. The compositions are useful in refractory applications having a need for high temperature curing agents such as for maintenance and repair within refractory vessels by gunning/spraying, manufacture of electrodes by the Soderberg method, and for use in blast furnace tap holes.

31 Claims, 2 Drawing Sheets

CURATIVES FOR PHENOLIC NOVOLACS

This is a division of application Ser. No. 08/225,890, filed Apr. 11, 1994, now U.S. Pat. No. 5,648,404.

BACKGROUND OF THE INVENTION

This invention relates to curing of phenolic novolac resins at high temperatures. More particularly, this invention relates to the use of (lower) alkoxylated melamine-formaldehyde resins and (lower) alkoxylated benzoguanamine-formaldehyde resins as curing or hardening agents for novolacs at high temperature. The curing agents of this invention are also simply referred to herein as triazine hardeners.

In, refractory applications, there is a need for a binder comprising a phenolic novolac and a curing agent wherein the binder remains uncured until high temperatures are attained. In the binders of this invention at least 50% of the cure and preferably at least 80% of the cure is accomplished above 392° F. (200° C.). This minimizes hardening and solidification of the binder in heated equipment and provides improved flow properties and prolonged workability for the binder.

There is also a need for such binder compositions which can be delivered to hot surfaces under pressure wherein the compositions further contain a particulate refractory and water wherein the hardener is not leached out from intimate contact with the other ingredients of the composition. This prevents or minimizes stratification on drying and curing of the composition.

Pitch as well as phenolic resins are used as binders for aggregates to prepare compositions for refractory tap hole application for blast furnaces. Tap hole mix users need a combination of early green strength and stability at 150° F. (65° C.) to 250° F. (121° C.) for up to several hours. Novolac with hexamethylenetetramine (hexa) has been used in such compositions. Also, hexa has been used as a hardener for novolac in the manufacture of electrodes. However, novolac/hexa binders lead to early cure whereas novolac without hexa or other hardener do not cure. Resoles are also unsatisfactory in such compositions because they cure at too low a temperature.

Melamine resins have also been mentioned as curing agents for novolacs or as thermosetting resins along with resoles, etc. in refractory compositions. However, the melamine resins used in this invention have advantageous properties in their use.

It is known that novolacs containing acids or thermally produced latent acids strongly catalyze the cure of melamine resins. However, the acid lowers the normal curing temperature of the novolac.

Apparatus and procedures exist for the robotic spraying of refractory material in a slurry of about 20% water for maintenance and repair of heated refractory surfaces. Illustrative of such a system is the TUNCAST Tundish Spray System of Foseco Inc.

SUMMARY OF THE INVENTION

In one aspect of this invention, a phenolic novolac resin and a triazine hardener is mixed with a refractory aggregate and water and then delivered to a hot refractory surface such as by spraying for eventual hardening, and binding of the aggregate on to the hot surface in the repair and maintenance of refractory structures.

In another aspect of this invention, a composition containing a phenolic novolac, a carbonaceous mineral as the refractory aggregate, and a triazine hardener can be used in anode manufacture for the aluminum industry.

In a further aspect of the invention, there is provided a composition comprising a refractory, a solution of novolac in a solvent, and a triazine hardener, which is suitable for plugging tap-holes.

In still another aspect of this invention, there is provided a composition of a triazine hardener adsorbed on a powdered inorganic adsorbent to provide a stable, free flowing, powdered composition which is subsequently mixed with powdered novolac and water for application to heated refractory surfaces.

In a still further aspect of this invention, a composition of a phenolic novolac resin in a solvent and a triazine hardener can be used as an impregnating agent for shaped refractories.

In yet a still further aspect, methods are provided for use of the compositions of this invention.

DETAILED DESCRIPTION OF THE INVENTION

The Phenolic Novolac Resin

Novolac resins are obtained by the reaction of a phenol and an aldehyde in a strongly acidic pH region. Suitable acid catalysts include the strong mineral acids such as sulfuric acid, phosphoric acid and hydrochloric acid as well as organic acid catalysts such as oxalic acid, para toluene-sulfonic acid, and inorganic salts such as zinc acetate, or zinc borate. The phenol is preferably phenol itself but a portion of the phenol can be substituted with cresol, xylenols, alkyl substituted phenols such as ethylphenol, propylphenol, and mixtures thereof. The aldehyde is preferably formaldehyde but other aldehydes such as acetaldehyde, benzaldehyde, and furfural can also be used to partially or totally replace the formaldehyde.

The reaction of the aldehyde and phenol is carried out at a molar ratio of 1 mol of the phenol to about 0.40 to 0.85 mol of the aldehyde. For practical purposes, phenolic novolacs do not harden upon heating but remain soluble and fusible unless a hardener (curing agent) is present.

In curing a novolac resin, a curing agent is used such as formaldehyde, hexa, or a melamine resin to overcome the deficiency of alkylene-bridging groups to convert the resin to an insoluble infusible condition. The novolacs used in this invention are generally solids such as in the form of a flake, powder, etc. The molecular weight of the novolac will vary from about 500 to 10,000, preferably 1,000 to 5,000 depending on their intended use. The molecular weight of the novolacs in this invention are on a weight average molecular weight basis. It can be advantageous to use a blend of high molecular weight (M.W.) novolac, e.g., at least 5,000, and low M.W. novolac, e.g., 500 to 1,000, blend such as a 5:1 to 1:1 ratio of high to low M.W. novolacs.

When a particulate refractory is used with binders of this invention, i.e., the novolac and a triazine hardener, the quantity of novolac can vary over a broad range sufficient to bind the refractory on curing of the novolac. Generally such quantity will vary from about 3% to 30% of novolac based on the weight of particulate refractory and preferably about 5% to 20% by weight of the particulate refractory.

The Refractory Aggregate

Conventional particulate refractory aggregates, such as those used in tap hole mixes, repair of blast furnace linings, as well as in the manufacture of electrodes, can be used in this invention. In the case of spraying and gunning, the aggregate is powdered such as with a particle size of from about 6 (3.3 mm) mesh to 325 mesh U.S. Standard Sieve (Screen) series. Preferably, the mixture of particles is graded so as to provide different sized particles to increase density, to provide free flow of the mixture, and to minimize rebound off the surface wall. For use in tap hole mixes, the refractory is preferably granulated, e.g., grains on the order of 2 millimeters, whereas for spraying and gunning, the particle sizes is preferably smaller than 1 millimeter.

Illustrative of the refractory aggregate there can be mentioned: bauxite; alumina; zircon; zirconia; clays; silica; chrome ore; magnesia; andalusite; kyanite; mullite; olivine; spinel; silicon carbide; carbonaceous mineral materials; and mixtures thereof. Calcined dolomite and calcium oxide can also be used when water is absent from the composition. The carbonaceous minerals consist primarily of carbon. A preferred carbonaceous mineral refractory is a sized coke aggregate. However, the carbonaceous aggregate may be formed of particles derived from premium petroleum coke, regular petroleum coke, anthracite coke, crushed scrap carbon electrodes, graphite and mixtures of the foregoing.

The Hardeners

The hardeners of this invention are (lower) alkoxylated melamine-formaldehyde resins or (lower) alkoxylated benzoguanamine-formaldehyde resins which are also simply referred to herein as triazine hardeners. Such hardeners have a water solubility of less than 15% by weight and contain from about 1 to 2.5 melamine or benzoguanamine rings per molecule.

The quantity of triazine hardener used is about 3% to 20% based on the weight of novolac, but is preferably about 7% to 15%.

The triazine hardeners are prepared from melamine (M) or benzoquanamine (B) and formaldehyde (F) with an F/M or B molar ratio of at least 4 to produce melamine-formaldehyde resins or benzoguanamine-formaldehyde resins, e.g., hexakis(methylol) melamine in the case of a melamine-formaldehyde resin. These formaldehyde resins are subsequently alkoxylated with (lower) alkoxy groups, i.e., having from 1 to 6 and preferably 1 to 4 carbon atoms. The total number of carbon atoms due the (lower) alkoxy groups affects both water solubility and cure temperature of these resins. The total number of carbon atoms will depend on the number of (lower) alkoxy groups as well as the number of carbon atoms in the (lower) alkoxy groups. The greater the number of carbon atoms the less is the water solubility and the greater is the temperature at which the triazine hardener cures the novolac. Thus, in preparing the triazine hardeners, the triazine-formaldehyde resin is alkoxylated with a sufficiently high number of carbons in the total of alkoxy groups so as to attain the water solubility of not greater than about 15% at 24° C. and preferably less than 10% solubility. Preferred triazine hardeners contain significant amounts of alkoxy groups having at least 2 carbon atoms such as butoxymethyl groups in contrast to methoxymethyl, unalkoxylated methylol, or unsubstituted hydrogen of the amine group.

The triazine hardeners having less than 15% of water solubility also improve stability of the compositions from the standpoint of minimizing clumping and providing a free flowing composition of the hardener when adsorbed on an adsorbent and provide high curing temperatures as will be more specifically discussed hereafter.

The triazine hardeners, e.g. the (lower) alkoxylated melamine-formaldehyde resins, can have a degree of polymerization of from about 1 to about 2.5 and preferably about 1.3 to 2.2. The degree of polymerization (D.P.) is the average number of triazine rings per molecule. It can be seen that in Formula A below, when the subscript $n$ is 0, the degree of polymerization is 1 in that only one triazine ring is present whereas when the subscript $n$ is 1, the degree of polymerization is 2 since there are two triazine rings.

The triazine hardeners have sealed mode differential scanning calorimetry thermal characteristics as described in Example 1 hereafter wherein a composition of 10% triazine hardener and 90% by weight of novolac produces a cure (exotherm) of at least about 14 calories per gram wherein at least 50% and preferably at least 80% of the cure (exotherm) occurs at 392° F. (200° C.) and above.

An idealized formula for a preferred class of (lower) alkoxylated melamine-formaldehyde resins used in this invention wherein the degree of polymerization is one or two is set forth in Formula A below. Such resins have a water solubility of less than 15% at 24° C. and the desirable differential scanning calorimetry properties of triazine hardeners of this invention.

Formula A wherein each of $R_1$, $R_2$, $R_3$, $R_4$, $R_5$, and $R_6$ is hydrogen, methylol (—$CH_2OH$) or (lower) alkoxymethyl, i.e., having 1 to 6 carbon atoms in the alkoxy group, and preferably 1 to 4 carbon atoms in such group; $n$ is 0 or 1 ; and provided that when $n$ is 0 about 75% to 95% of the R groups are (lower) alkoxymethyl (A—O—$CH_2$— wherein A is alkyl of 1 to 6 carbon atoms and preferably 1 to 4 carbon atoms with the further proviso that at about the 75% to 89% level of alkoxymethyl groups the average such group has at least 2 carbon atoms in the alkoxy group and at about the 90% to 95% level of alkoxymethyl groups, the average group has at least 1 carbon atom in the alkoxy group. For the Formula A resins where $n$ is 1, i.e., a D.P. of 2, about 50% to 95% of the R groups are alkoxymethyl with the further proviso that at about the 50% to 75% level of alkoxymethyl groups the average such group has at least 2 carbon atom in the alkoxy group and at about the 76% to 95% level of alkoxymethyl groups, the average group has at least 1 carbon atom in the alkoxy group.

A degree of polymerization higher than 2 can tolerate higher levels of smaller chain lengths of the alkoxy groups whereas resins with D.P. of about 1.5 will have intermediate requirements to the above. Higher D.P.'s can also tolerate some or more secondary amino (NH) and methylol ($CH_2OH$) functionality.

Formula B below shows a idealized structure of a preferred class of (lower) alkoxylated benzoguanamine-formaldehyde resin having a D.P. of one. For the Formula B resins at least 75% of the R groups are (lower) alkoxymethyl.

Formula B wherein each of $R_1$, $R_2$ $R_3$, and $R_4$, in Formula B is hydrogen, methylol, or (lower) alkoxymethyl. The benzoguanamines also have D.P. values varying from 1 to 2.5 etc. and can all be methoxymethyl with 75% of the R groups being alkoxymethyl. All of the alkoxymethyl groups of the benzoguanamines can be methoxymethyl.

The above Formulae A and B resins provide the parameters for specific idealized resins having a D.P. or 1 or 2. However, the triazine hardeners are resinous mixtures and generally have D.P.'s intermediate 1 and 2 as well as intermediate values above 2. The preferred chemical make-up of the hardeners of this invention when the D.P.'s are not whole numbers can be determined by following the guideline that essentially a straight line relationship exists in the number of and type of alkoxy groups for the resins having a D.P. of 1 to those having a D.P. of 2.5 based on extending a straight line between points of a D.P. of 1 and a D.P. of 2 as discussed above.

In illustrating some of the above, the following idealized Formula C is a (lower) alkoxylated melamine-formaldehyde resin having a D.P. of one wherein 50% of such alkoxymethyl groups are methoxymethyl and the remaining 50% of such alkoxymethyl groups are butoxymethyl.

Formula C

Preparation of Free Flowing Hardener

The triazine hardeners of this invention are viscous or syrupy materials. By placing the syrupy hardeners of this invention on powdered aggregate or other powdered inorganic adsorbent and then mixing the aggregate with novolac, aggregation and clumping of the composition is avoided or at least greatly minimized. This produces a free flowing composition such as a powder which is subsequently mixed with powdered novolac and refractory aggregate.

The quantity of the triazine hardener adsorbed on the refractory can be up to about one part or more of hardener per part of adsorbent. Such adsorbents are usually porous granular particles. The interior pores give rise to interior surfaces totaling $10^2$ to $10^4$ square meters per gram. Illustrative of adsorbents there can be mentioned: acid treated clay; activated alumina and bauxite; aluminosilicates; fumed silica; magnesium silicate; calcium silicate; bone char; silica gel; fuller's earth; and mixtures thereof.

At times it may be advantageous to reduce emission of organic volatiles, e.g., methanol, butanol, etc., when curing up to 350° C. with a triazine hardener, either with or without the use of an adsorbent. Substitution of about one-third to about two-thirds, preferably about a 50% substitution, of the triazine hardener with a spray dried resole will decrease such volatiles while maintaining many other benefits of high temperature curing. Preferred resoles have a molecular weight of about 1,000 to 2,000 and are exemplified by CASCOPHEN W3154M, CASCOPHEN W735B, and CASCOPHEN W735E, all of Borden, Inc. These resins contain about 90% to 92% non-volatile matter and about 2.5 to 3% of sodium ion. Spray dried resoles containing lithium, calcium, potassium, or quaternary ammonium, e.g. tetramethylammonium, or choline, in place of sodium may also be used either alone or in combination with each other or the aforesaid CASCOPHEN resins.

Joint use of spray dried resole and triazine hardener can be useful in high temperature processing. Use of higher temperatures allow processing of higher melting (>125° C.) novolacs.

APPLICATIONS

The compositions of this invention can be used for spraying or gunning to hot refractory surfaces, in tap hole mixes, in the production of graphite electrodes for the production of aluminum, molding compounds, and impregnating pre-shaped refractory articles such as brick. They can be applied to refractory surfaces which are at room temperature but application of the raw batch composition to heated surfaces is preferred since it minimizes or avoids the down-time required to permit such surfaces to cool and decreases rebound of aggregate from refractory surfaces such as that of tundish vessels.

Due to the longer time for hardening, the compositions of this invention can withstand longer residence periods in the propelling equipment such as a mud gun and other spraying equipment, in tap hole mix extruders, and in forming an anode.

The compositions of this invention, with or without water, are useful in the repair and maintenance of heated refractory surfaces. Such compositions are preferably delivered to the surface including that of filling cracks, etc. of the refractory article being repaired or maintained by propelling the composition toward the refractory article such as by air or hydraulic pressure. The term spraying is used herein to describe such propelling of the composition to its destination even though such action may also be termed "gunning". When used, the water in such compositions can vary from about 3% to 25% by weight of the composition.

Spraying can be of two different forms. In one form, conventionally called spraying, all of the components, of the composition, including water, are premixed, such as in a tank. The quantity of water in such premixed spray slurry will preferably vary from about 10% to about 25% and preferably about 15% to 22% by weight of the sprayable composition.

In the form of spraying called "gunning", the quantity of water is preferably from about 8% to about 15% and particularly about 10% to 12% and there is mixing of the water with the dry ingredients in the delivery system such as that of in-line mixing. Preferred resins for low water extractability are CYMEL 1168 and CYMEL 303.

The length of the supply line in spraying before exit of the spray through a nozzle can be quite long such up to about 60 feet. Thus, the composition stays in the system before being applied to the surface it is intended to protect for from a few minutes to a few hours or more.

Low molecular weight (M.W.), e.g., 500 to 1,500, novolacs are preferred for use in solution for tap hole and impregnation applications. However, such low M.W. novolacs are generally avoided in gunning/spraying applications because powdered novolac of 1,000 to 1,300 weight average molecular weight rapidly cakes upon mixing with water, whereas lower M.W. novolacs, e.g. those having a M.W. of about 500, are self-congealing. However, low M.W. (1,000 to 1,500) novolac powder can be used with an equal or larger, e.g., 3 to 5 times, amount of high M.W. novolac powder for gunning/spraying applications. For gunning and spraying applications with water, it is preferred that the average M.W. of the novolac or novolacs be at least 1,300 and preferably at least 1,500.

Contact with water during application of the binder composition can be very brief, e.g., less than one minute as in gunning, or can be up to several hours as in spraying. Therefore, the ideal curative for novolac powder should not only be active at the desired temperature, but also should not be solubilized by water as this creates subsequent concentration gradients as the mix is drying and hardening. As discussed previously, the molecular weight of novolac is also important. It has been found that little or no melamine resin is extracted by water from a powdered mixture of novolac and the adsorbed melamine resin of this invention whereas extraction of such melamine resin is largely increased in the absence of novolac. Therefor, it is advantageous to mix well the powdered novolac with the triazine hardener. The triazine hardener will generally be adsorbed on an adsorbent in powdered form.

Additionally, suspending agents, anti-hydration agents, and dispersants can also be used so as to use less water and to maintain flowablity.

In tap hole compositions and brick impregnation compositions, there is generally less than 5% water and the binder of novolac and triazine hardener is placed in a matrix of a solvent such as an alcoholic solvent, e.g., ethylene glycol, diethylene glycol, triethylene glycol, and glycol ethers thereof with alkoxy groups of 1 to 4 carbon atoms, or glycerine. The viscosity of tap hole mix is generally about 3,000 to 10,000 cps and preferably about 5,000 cps and the solids are about 50% to 75% of the tap hole composition. The tap hole composition is generally applied by means of a mud gun and a tapping rod whereby the composition is introduced into the tap hole and permitted to cure.

One means of increasing corrosion resistance (service life) of pre-shaped refractory articles, such as brick, is to reduce its porosity. This can be accomplished by impregnating the pores via a vacuum technique with hot pitch at elevated temperatures (about 400 to 600° F.). Environmental hazards associated with pitch and the high temperatures (about 400 to 550° F.) required to reduce its viscosity to 100 cps or preferably lower are distinct manufacturing disadvantages. These disadvantages can be circumvented by impregnating the brick or other pre-shaped refractory article with a hot solution (up to about 125° C.) of phenolic novolac containing triazine hardener and, subsequently, curing and carbonizing the novolac resin. High concentrations (60 to 80%) of preferably low molecular weight (about 500 to 1,500) novolac in glycol or glycol ether solvent containing alkoxylated triazine hardener are preferred for this purpose.

The compositions of this invention have advantageous properties in the thermoforming of shaped refractory composites including electrodes. Thus, use of high temperatures while still maintaining good flow of the composition can be used in the thermoforming of shaped electrodes such as that which are disclosed in U.S. Pat No. 4,775,455 of Oct. 4, 1988 to P. Chandramouli et al. and U.S. Pat. No. 4,897,170 of Jan. 30, 1990 to P. Chandramouli, both of which are incorporated herein by reference in their entirety. Thus a novolac-triazine hardener binder can be substituted for the binder, e.g., resole resin, novolac and mixtures thereof, together with curing agent such as hexamethylenetetramine in the thermoforming of such shaped articles at elevated temperatures, e.g. above 150° C. This is particularly the case in processes such as the Soderberg process for making a continuous carbon electrode.

In the Soderberg process, the feedstock composition will have sufficient mobility to move through the Soderberg temperature gradient as a viscous bed of heated composition as it enters a use zone of the Soderberg electrode as a paste, then hardens and attains electrode integrity as disclosed in the above mentioned U.S. Pat No. 4,897,170.

The binders of triazine hardeners with the novolac resin can also be used for manufacture of other shaped article such as by extruding, tamping, ramming, etc, at elevated temperatures to form various shapes when it is desired to minimize cure of the binder and maintain thermoplasticity at temperatures between about 150° C. and 250° C.

The temperature of the surface to which compositions containing the novolac and triazine hardener is applied can vary over a wide range. Such surface can be at room temperature but preferably, to avoid shut-down time, the temperature will be from about 200° F. (93° C.) to 1,000° F. (538° C.) or even higher. Illustrative of heated refractory surfaces to which the sprayable compositions of this invention can be applied, there can be mentioned heated exposed surfaces, cracks and crevices in need of repair or maintenance, such as that of: the basic oxygen furnace (BOF); rotary kilns; tunnel kilns; tundish vessels; runners for transportation of molten metal; and sleeves and slide gates used in high temperature refractory applications.

Substances which are acidic at normal temperature or those which are latent acids in that they break down in the environment of use, e.g., the high temperatures such as those of above 150° F. (66° C.), should be avoided in the compositions of this invention. One reason for this is that the acidic material reacts with alkaline refractories and causes deterioration. Another reason is that acidic material will substantially decrease the cure temperature of the binder composition.

In order that those skilled in the art may more fully understand the invention presented herein, the following procedures and examples are set forth. All parts and percentages in the examples as well as elsewhere in this application are by weight unless the context indicates otherwise. Room temperature means about 75°F. (24° C.) to 77° F. (25° C.).

TABLE A

CHARACTERISTICS OF MELAMINE RESINS

The melamine resins evaluated in the following examples are characterized in Table A below.
1. CASCOMEL MF-600. This a non-alkoxylated, spray dried solid melamine resin supplied by Borden, Inc. It has an F/M molar ratio of 2 and a molecular weight of about 700.
2. CYMEL 301. This is a (lower) alkoxylated melamine-formaldehyde resin of American Cyanamid Company and which has a D. P. of about 1.5, approximately 5.33 methoxymethyl groups per triazine ring and about 5% of methylol content.

3. CYMEL 303. This is a (lower) alkoxylated melamine-formaldehyde resin supplied by American Cyanamid Company having approximately a D.P. of 1.75 and about 5.6 methoxymethyl groups per triazine ring and about 1.5% of methylol content.
4. RESIMENE 750. This is a (lower) alkoxylated melamine-formaldehyde resin of Monsanto Company having an approximate D.P. of 2.2 with about 40% of the amino groups being alkoxymethyl groups and 2.4 being butoxymethyl groups per triazine ring.
5. RESIMENE 751 This is a (lower) alkoxylated melamine-formaldehyde resin of Monsanto company having a D.P. of about 1.1 with about 2.9 methoxymethyl groups and 2.6 butoxymethyl groups per triazine ring.
6. CYMEL 1168 This is a (lower) alkoxylated melamine-formaldehyde resin of American Cyanamid Company. It has an approximate D.P. of 1.7 with about 5.6 alkoxymethyl groups per triazine ring wherein the number of methoxymethyl and isobutoxymethyl groups are about equal.
7. RESIMENE CE-4514 This is a (lower) alkoxylated melamine-formaldehyde resin of Monsanto Company having a D.P. of approximately 2.0 with 2.2 methoxymethyl groups and 2.1 butoxymethyl groups per triazine ring.
8. RESIMENE CE-6517. This is a (lower) alkoxylated melamine-formaldehyde resin of Monsanto Company with about 15% of n-butanol having a D.P. of 2.2 with 2.1 methoxymethyl groups and 0.9 butoxymethyl groups per triazine ring.
9. RESIMENE 7512. This is a (lower) alkoxylated melamine-formaldehyde resin of Monsanto Company having a D.P. of about 1.8 with 4.8 butoxymethyl groups per triazine ring.
10. ARICEL PC-6N. This is a water soluble melamine resin supplied by Astro Industries having 80% solids, a F/M molar ratio of about 4.3 wherein about one-third of the non-aromatic amino sites have been methoxymethylated

TABLE C

PROPERTIES OF NOVOLACS USED IN THE EXAMPLES

| DURITE* Resin | Approximate Melting Point | Molecular Weight | Free Phenol (%) |
|---|---|---|---|
| SD-1731A | 85–95° C. | 1,000–1300 | 0.1 Maximum |
| SD-405A | 114–120° C. | 4,000–8,000 | 1.0 Maximum |
| SD-3072 | 108–116° C. | 4,000–8,000 | 2.0 to 3.5 |

*Trademark of Borden, Inc.

All of the novolacs contained about 0.7% of hexa contaminant, except for SD-1731A which did not contain such contaminant. This contaminant did not appear to significantly affect the test results set forth herein, except as may be specifically indicated.

EXAMPLE 1

DIFFERENTIAL SCANNING CALORIMETRY RESULTS

Curing temperatures were determined by sealed mode differential scanning calorimetry (DSC) on solid blends containing SD-3072 novolac. The mixes for the DSC tests were made in a high speed miniblender using 11% curative on novolac, i.e., 2 g of curative and 18 g of the novolac. The DSC's were run in hermetically sealed aluminum pans with a heating rate of 10° C. per minute up to 572° F. (300° C.) or up to 662° F. (350° C.). The differential scanning calorimeter used was Differential Scanning Calorimeter model 910S of TA Instruments/Du Pont. Indium was used to standardize the equipment and the software used was General V4.1 C Du Pont 2000.

Figure 1:
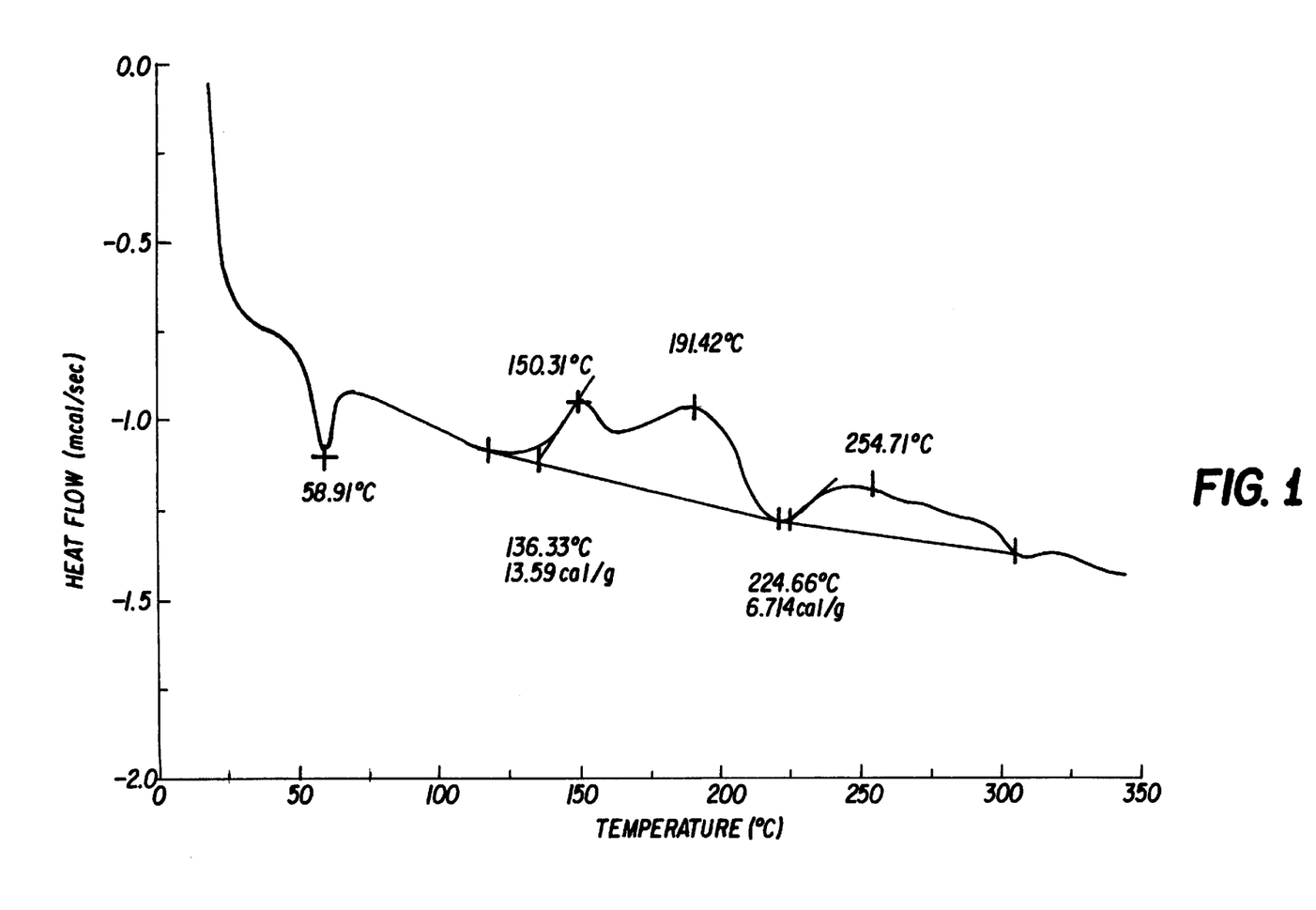
FIG. 1 is a sealed mode differential scanning calorimetry graph of a 90:10 mixture of phenolic novolac resin SD-3072 and a (lower) alkoxylated melamine-formaldehyde resin, namely, RESIMENE CE-4514 of Monsanto Company.
Figure 2:
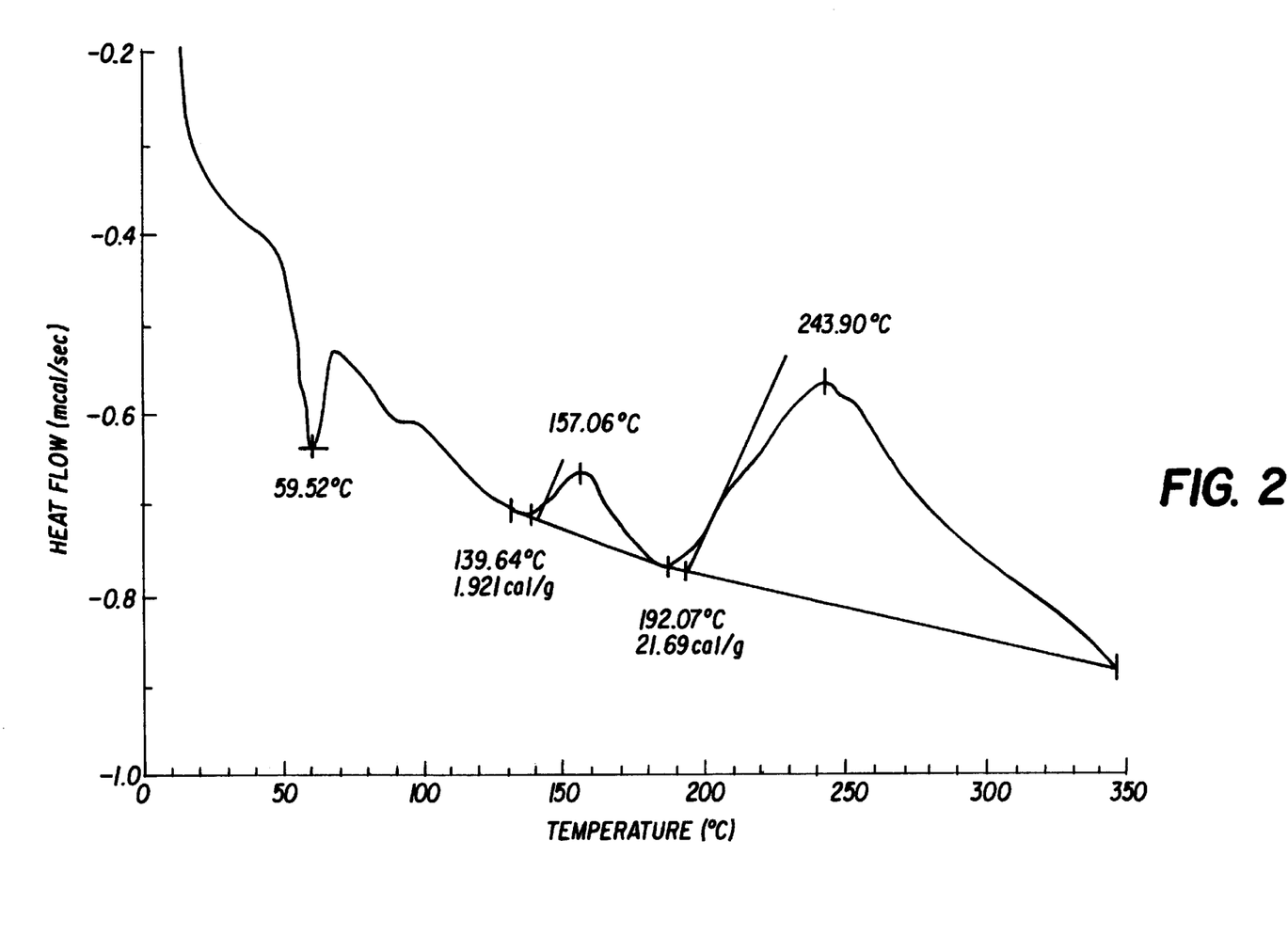
FIG. 2 is a sealed mode differential scanning calorimetry (DSC) graph of a 90:10 mixture of phenolic novolac resin SD-3072 of Borden, Inc. and a (lower) alkoxylated melamine-formaldehyde resin, namely, CYMEL 1168 of the American Cyanamid Company.

FIG. 1 and FIG. 2 show sealed mode differential scanning calorimetry (DSC) curves with heat flow in millicalories per second and temperatures in ° C. Referring now specifically to FIG. 1 there is an endotherm at 58.91° C. which represents heat absorption due to melting of the novolac. There is a major exotherm indicating curing starting at 136.33° C. and extending to 224.66° C. which released 13.59 calories per gram of the sample. The sample was composed of 90 parts by weight of DURITE Novolac Resin SD-3072 and 10 parts by weight of RESIMENE CE 4514. The amount of exotherm on a calorie per gram of sample basis is determined by the area under the curve between the start of the exotherm at 136.33° C. and the end of the exotherm at 224.66° C. This exotherm released 13.59 calories per gram of sample. A second smaller exotherm occurred between 224.66° C. and about 300° C. which released 6.714 calories per gram of sample. In this sample, only about 33% of the exotherm acurred at or above 200° C.

In FIG. 2, the sample is composed of the same novolac as in FIG. 1 in a 90 to 10 ratio by weight but with the (lower) alkoxylated melamine-formaldehyde resin CYMEL 1168. This sample showed an endotherm at 59.52° C. which represents heat absorption due to the melting of the novolac. It also showed a small exotherm of 1.921 calories per gram between about 139.64° C. and 192.01° C. and a large exotherm of 21.69 calories per gram from about 192.07° C. to about 340° C. About 98% of the exotherm for this binder occurred at 200° C. and above.

TABLE 1

Thermal analysis (DSC) Data

| Mix | Description[a] | Exotherm * Peak, ° C. | Approx. Range, ° C. | Cal./g (%) [b] |
|---|---|---|---|---|
| 1 | CYMEL 303 | 205/267 (doublet) | 180–290 | 9.7 (89) |
| 2 | 90:10 SD-3072/ CYMEL 303 | 136.1 242.1 | 120–150 180–290 | 1.7 15.4 (95) |
| 3 | 90:10:10 SD-3072/CYMEL 303/ Al$_2$O[1] | 150 | — 180–295 | Trace 15.7 |
| 4 | 90:10:10 SD-3072/CYMEL 303/ MICRO-CEL 8020[2] | 139.9 241.9 | 120–160 180–295 | 0.8 16.4 |
| 5 | 90:10 SD-3072/ CYMEL 1168 | 157.1 243.9 | 135–180 185–340 | 1.9 21.7 (98) |
| 6 | 90:10 SD-3072/ RESIMENE CE-4514 | 150.3/191.4 (Doublet) 254.7 (fairly flat) | 125–215 215–300 | 13.6 6.7 (100) |
| 7 | 90:10 SD-3072/ RESIMENE CE-6517 | 152.2 241.3 (very Broad) | 120–175 175–315 | 8.5 17.5 (88) |
| 8 | 90:10 SD-3072/ RESIMENE 7512 | 150.0 200.2 | 140–160 165–315 | 1.2 17.2 (80) |
| 9 | 90:10 SD-3072/ CASCOMEL MF-600 | 129 219.1 | 85–145 150–285 | 3.7 10.4 |

TABLE 1-continued

Thermal analysis (DSC) Data

| Mix | Description[a] | Exotherm * Peak, ° C. | Approx. Range, ° C. | Cal./g (%) [b] |
|---|---|---|---|---|
| 10 | 90:10 SD-3072/ | 150.8 | 115–185 | 7.22 |
|  | RESIMENE 750 | 247.6 | 185–320 | 8.13 (98) |
| 11 | 90:10 SD-3072/ | 151.7 | 137–170 | 1.84 |
|  | RESIMENE 751 | 237.5 | 180–315 | 13.99 (96) |

* Small exotherm peak at about 140° C. to 150° C. in Mixes 2, 4, 5, 8, and 11 is attributed to the 0.7% hexa contaminant.
[a]See Table A for description of the melamine resins.
[b]Percent exotherm occurring at 200° C. and above but does not include lower temperature curing exotherms for the same resin mix.
[1]VERSAL GL of LaRoche Chemicals.
[2]A Calcium Silicate of the Celite Corp.

The results show that with phenolic novolac SD-3072, the melamine resins CYMEL 1168 and CYMEL 303 provide the highest degree of exotherm from 200° C. and above. RESIMENE CE-4514 provides about two-thirds of its exotherm below 200° C. whereas RESIMENE CE-6517 provides about ⅓ of its exotherm below 200° C.

EXAMPLE 2

SOLUTION CURING STUDIES OF SD-1731A NOVOLAC[a] WITH MELAMINE RESIN.

Novolac was used as 50% solution in diethylene glycol. 1.5 g 50% solution used per mix and 0.08 g additive used unless indicated otherwise. The procedure for this example was as follows: Materials were charged to a small glass vial (4 ml. capacity) containing a glass capillary melting point tube (to be used as a stirring rod during heating to about 150° C.); vials placed in a silicon oil bath contained in a 50 ml beaker fitted with a thermometer, and a magnetic stirring bar and shielded with aluminum foil. The samples were heated on a stirrer/hot plate to 510° F. (265° C.)+/−3° C. over 50 minutes except for mix 3 which was heated for 40 minutes. The onset of bubbling, gelling, etc. was observed and reported below. [a] Average molecular weight of about 1,000

| Mix | Additive | Approximate Bath Temp(° C.)* To | | |
|---|---|---|---|---|
|  |  | Start Bubbling | Gelling | Gelled |
| 1 | None | None | None | None |
| 2 | Melamine | 228 | None | None |
| 3 | Hexa | 140 | 140 | 150 |
| 4 | CYMEL 1168 | 197 | None | None |
| 5 | RESIMENE CE-4514 | 168 | 252 | 260 |
| 6 | RESIMENE CE-6517 | 195 | None | None |
| 7 | RESIMENE 7512 | 205 | None | None |
| 8 | RESIMENE 750 | 197 | None | None |
| 9 | RESIMENE 751 | 180 | None | None |
| 10 | ARICEL PC-6N | 150 | 190 | 220 |
| 11 | CASCOMEL MF 600 | 165 | None | None |
| 12** | CASCOPHEN W3154M and CYNEL 303 | 160 | 218 | Soft gel at 265 which became rigid on cooling to room temperature |

*The mix temperature is likely to be about 5° C. lower at about 150° C. and about 10° C. lower at about 250° C. bath temperature.
**Equal quantities of the CASCOPHEN and CYMEL were used so as to provide 5% of each B.O.R. Use of the CASCOPHEN alone at 10% B.O.R. (based on weight of resin) gives, up to 260° C., after cooling to room temperature, an immobile mass which at 65° C. moves slowly. CASCOPHEN W3154M is a spray dried resole resin of Borden, Inc.

The mixes of this Example 2 were allowed to gradually cool to room temperature and viscosities compared in a given set of 3 or more samples.

Set of mixes 4, 5, and 6: 5 is hard, 4 and 6 are solutions; 6 is immobile; 4 is softer and shows very slow flow.

Set of Mixes 1, 2, and 7: one (1) is fairly fluid, essentially identical to unheated solution; 2 is fluid but less than 1 ; and 7 is very viscous but more mobile than 4. No. 3 gelled hard.

Set of Mixes 8, 9, and 10: show essentially no flow and are more viscous than 7. Mix 10 has gelled hard.

SIMULTANEOUS COMPARISON OF FLOW AT 65° C. AND AT ROOM TEMPERATURE

Vials of mixes 1, 2, 4, 6, 7, 8 and 9 of this Example 2 were placed upright against a plexiglass sheet backing and placed in a 65° C. oven for half an hour and then removed. Mix 5 had previously gelled. The assembly was laid flat on the table top and relative viscosities observed while the vials were still at about 65° C. The order of increasing viscosity was 11 and 6>4>8 is about the same or greater than 9 which is > (greater than) 7>2>1. Wherein 6 was very slow to move, 4 and 7 were moderately fluid. One (1) and 2 were very fluid.

The vials were allowed to stand upright at room temperature, about 72° F. (23° C.), for 3 hours and again laid flat on the table top and observed after 2 minutes. Mixes 8, 9, and 11 were not included in this test. The results were as follows:

| Mix No. | Approximate Flow in Inches |
|---|---|
| 1 | 1 |
| 2 | 7/8 |
| 7 | 1/4 |
| 4 | 1/8 |
| 6 | Nil (most viscous) |

EXAMPLE 3

ADSORPTION OF MELAMINE RESIN ON INORGANIC ADSORBENT

Dry blends of melamine resin on inorganic adsorbent were easily made by gradually adding, in 4 to 5 portions, melamine syrup to adsorbent, and mixing well after each addition.

| Melamine Resin (M) | Adsorbent (A) | M/A Ratio By Weight |
|---|---|---|
| CYMEL 303 | VERSAL GL (ALUMINA) | 1:1 |
| CYMEL 303 | MICRO-CEL 8020 (calcium silicate) | 7:3 |
| CYMEL 1168 | VERSAL GL (ALUMINA) | 1:1 |
| CYMEL 1168 | SATINTONE 5 HB* (aluminum silicate) | 1:1 |
| RESIMENE CE-4514 | VERSAL GL | 1:1 |
| RESIMENE CE-4514 | MICRO-CEL 8020 | 9:5 |

*A product of the Englehard Corp.

All of the above mixes of adsorbed melamine resin were free flowing powders.

EXAMPLE 4

WATER EXTRACTION OF ADSORBED MELAMINE RESIN WITH AND WITHOUT NOVOLAC

The objective of this example is to determine water leachability of melamine resins in the presence of powdered novolac.

Experiment No. 1. 3.0 g of 1:1 CYMEL 303 adsorbed on VERSAL GL was stirred for 70 minutes at room temperature with 20.5 g water. The solid was centrifuged and the solution (17.2 g) obtained was evaporated and vacuum dried to give 1.1 g liquid CYMEL. Thus, about 75% of the CYMEL 303 was extracted out of this composition.

Experiment No. 2. 10 g of a powdered mixture of phenolic novolac SD-3072 with CYMEL 303 adsorbed on VERSAL GL on a weight ratio of 90:10:10 (contains 0.91 g of the melamine resin) was stirred at room temperature for 70 minutes with 30 g. water. The solid which partially caked was suction filtered, the filtrate 27.5 g was evaporated and vacuum dried. The extract gave 0.13 g of a liquid/solid mixture. The solid was dried at 65° C. and then in vacuo to give about 10.4 g. Thus, essentially no resin was extracted. It can be seen from Experiments 1 and 2, that the water extractability of melamine resin is greatly diminished in the presence of novolac.

Experiment No. 3. Experiment No. 2 was repeated using 10.5 g SD-3072/CYMEL 1168/VERSAL GL in a ratio of 90:10:10 powder blend (contained 1 g of melamine resin). Extractables were 0.02 g of a cream tan solid which was not identified showing partial melting at about 190° C. to 260° C. Therefor, essentially no melamine resin is extracted.

Experiment No. 4. (Model). 10.0 g of SD-3072 was stirred with 30 g of water as in Experiment No. 2 above. The filter cake was washed with 10 g of water. Drying of the filter cake yielded 0.03 g of whitish solid.

Experiment No. 5. Experiment No. 4 was repeated with 10.0 g of 90:10 mixture of phenolic novolac SD-3072 and RESIMENE CE-4514 (1.0 g contained). Evaporation of filtrate gave 0.36 g of solid with a very slight sticky character. Thus about one third of the melamine resin was extracted.

Experiment No. 6. Experiment No. 4 was repeated using 9 g of novolac powder and 1.3 g of ARICEL PC-6N (80% solids). Evaporation of filtrate gave 0.72 g of a light amber gum (72% of the ARICEL solids). It can be seen that a majority of the melamine resin is extracted into water in the presence of novolac powder. This markedly contrasts with preferred resin hardeners.

EXAMPLE 5

PROPELLING MIX ONTO 300° F./600° F. SURFACE

The objective of this example was to determine the non-sagging ability of a magnesia/water/novolac-curative mix at high temperature.

A mixture was prepared of: 0.44 g of 1:1 CYMEL 1168 adsorbed on VERSAL GL; 0.28 g of a water soluble sulfonated naphthalene-formaldehyde condensate dispersant; 2.2 g of phenolic novolac SD-405A; and 50 g magnesia fines having at least 99% MgO. Then 12.5 g of water was added with further mixing. A portion of the mix was thrown by use of a spoon on to a preheated firebrick which was 1 inch thick and which had been in a furnace for 1 hour at a temperature of 600° F. The mixture stuck to the heated surface with no sagging. The experiment was repeated with firebrick heated at 300° F. and again there was no sagging.

EXAMPLE 6

THERMOGRAVIMETRIC ANALYSIS OF NOVOLAC/CYMEL 303 WITH/WITHOUT ADSORBENT

Thermogravimetric analysis (TGA) were run under nitrogen at a heating rate of 10° C. per minute to a temperature of 250° C. followed by isothermal at about 482° F. (250° C.) for 30 minutes and then heated to 1832° F. (1,000° C.) at 68° F. (20° C.) per minute. TGA's to 1,832 ° F. (1,000° C.) under nitrogen showed that cured SD-3072 novolac gave carbon yields of 52% to 57% when the curative was CYMEL 303 with and without the presence of inorganic adsorbent such as VERSAL GL or MICRO-CEL 8020. These levels of carbon yield are equivalent to that provided by hexa as curative. It can be concluded that the presence of adsorbent has little or no effect on carbon yield. The TGA's were run on a 951 Thermogravimetric Analyzer of TA Instruments/Du Pont.

EXAMPLE 7

EFFECT OF MELAMINE STRUCTURE ON COALESCENCE WITH PHENOLIC NOVOLAC SD-3072

This example shows the difference in coalescence or caking of a melamine resin having insufficient longer chain alkoxy groups. A 90:10 SD-3072/CYMEL 303 blend coalesces upon standing 2 weeks at room temperature but redisperses (providing mobility of solids) upon vigorous agitation, On the other hand a 90:10 SD-3072/CYMEL 1168 blend does not coalesce after two weeks.

EXAMPLE 8

SOLUBILITY OF LOWER ALKOXYLATED MELAMINE FORMALDEHYDE RESINS IN WATER

This examples shows the solubility of various (lower) alkoxylated melamine-formaldehyde resins in water. Ten grams of various melamine resins were stirred well for one hour with 100 g de-ionized water at room temperature (about 24–25° C.). An aliquot (1/5 or 20 g) was removed, evaporated at room temperature, and finally dried under high vacuum. Table 8 below shows the results of these tests.

TABLE 8

| Resin | Residue, g | 5 Times Residue | Approximate % of non-volatiles solubilized |
|---|---|---|---|
| CYMEL 1168 | 0.042 of a white solid | 0.210 | 2.1 |
| RESIMENE CE-6517 | 0.012 of an oil | 1.060 | 10.6 |
| RESIMENE 7512 | 0.004 | 0.020 | 0.2 |
| CYMEL 303 | 1.64 of a clear colorless oil | 8.20 | 8.2% |

EXAMPLE 9

EFFECT OF WATER ON LOW MOLECULAR WEIGHT NOVOLACS

The object of this example was to determine dispersibility of low molecular weight powdered phenolic novolac in water which is key to obtaining good dispersibility in gunning/spraying applications.

Experiment 1. To 10.0 g of powdered phenolic novolac SD-1731A was added 30 g water followed by vigorous agitation. The powder largely caked within several seconds.

Experiment 2. Experiment 1 was repeated but using a mixture of 8.0 g of powdered novolac SD-3072 and 2.0 g powdered novolac SD-1731A. No obvious caking of resin was observed up to at least 3 hours after addition of water.

Experiment 3. Experiment 1 cannot be performed with even lower molecular weight novolac such as SD-333A of Borden, Inc. which has a molecular weight of about 500 since such low molecular weight novolac can not be obtained as free flowing flake or powder at room temperature because it is self-congealing. In fact, an extremely viscous solution can be obtained by addition of 7 to 9% water.

The results of this example indicate the unsuitability of low molecular weight novolac resin alone for gunning/spraying applications. However, a mixture of low molecular weight novolac can be dispersed in water in the presence of a much larger amount of higher molecular weight novolac.

EXAMPLE 10

STABILITY OF PHENOLIC NOVOLAC SD-1731A/CYMEL 1168

Long term stability at room temperatures and short term stability at about 100° C. are particularly desirable for tap hole and impregnation applications. 40% solutions of SD-1731A novolac in ethylene glycol with/without Cymel 1168 (10% based on novolac solids) were followed with time in Gardner bubble viscosity tube at 25° C. Initial viscosities of both were 1,000 centistokes and after 2 months the viscosities of both were about 970. Both solutions when placed in a 65° C. oven for 8 hours showed no viscosity change upon cooling to room temperature.

A test tube (18×150 mm) was charged with 5.0 g of flake novolac SD-1731A, 0.50 g melamine resin Cymel 1168 and a glass rod (5 mm diameter). The tube was placed in a boiling water bath (100° C.) for 4 hours. During the first 10 minutes the mix was stirred frequently to give a homogeneous melt. Stirred occasionally thereafter. After the 4 hour period 7.5 g ethylene glycol was added to the warm melt to effect solution. A gardner viscosity (25° C.) of Q and ¾ (about 460 centistokes) was obtained. When the Cymel 1168 was added to a solution of SD-1731A (5.0 g) in glycol (7.5 g), without further heating, a viscosity of M and ⅔ (about 335 centistokes) resulted. This experiment shows that only a modest increase in viscosity (or curing) results after several hours at 100° C. but essentially none occurs after prolonged storage at room temperature followed by 8 hours at 65° C.

EXAMPLE 11

GUNNING ON HOT SURFACE

A composition of: particulate magnesia refractory aggregate; about 10% to 15% of water, based on the weight of the composition; about 2.5% of novolac SD 405A, based on the weight of the magnesia; and 20%, based on the weight of resin (B.O.R.) of CYMEL 1168 adsorbed on VERSAL GL, at a 1:1 ratio by weight, was gunned without difficulty onto a refractory plate (60% to 70% alumina). The plate was withdrawn from an oven at a temperature of about 1,800° F. (982° C.) to 1,900° F. (1038° C.). At the time of gunning, the plate was at a temperature of about 1,200° F. (649° C.) to 1500° F. (816° C.). The gunning built up a four inch layer of refractory lining. About 10 to 15 minutes later, about three inches of the lining broke off.

EXAMPLE 12

GUNNING ON HOT SURFACE

The procedure of Example 11 was essentially followed with magnesia refractory and about 10% to 15% of water but using 2.5% of a novolac blend based on the weight of the magnesia. The novolac blend consisted of 4 parts of SD-405A with 1 part of SD-1731A. Additionally, the gunned composition contained 5% spray dried resole (CASCOPHEN W3154M), 10% of a 1:1 blend of CYMEL 303/VERSAL GL, and 5% of a phosphate binder, wherein the additional ingredients were based on the weight of novolacs. In this example, the refractory lining applied to the refractory plate did not break off as in the previous example and showed structural integrity upon cooling to room temperature and reheating to about 250° F. and later to about 600° F.

What is claimed is:

1. A binder composition comprising a mixture of:
    a phenolic novolac resin; and
    a triazine resin having a water solubility of less than 15% by weight at 24° C. and a degree of polymerization of about 1 to 2.5 wherein the quantity of triazine resin is about 3 to about 20% based on the weight of the novolac, said triazine resin being a (lower) alkoxylated melamine-formaldehyde resin having a formaldehyde-:melamine ratio of at least about 4.3 and at least about 4.3 alkoxymethyl groups per triazine ring.

2. The binder composition of claim 1, wherein sealed mode differential scanning calorimetry for a sample essentially composed of 90 parts of the novolac and 10 parts, by weight, of the alkoxylated resin has at least 50% of its caloric exotherm at a temperature of at least 200° C.

3. The binder composition of claim 2, wherein at least 80% of the caloric exotherm is at a temperature of at least 200° C. and the water solubility at 24° C. is less than 10% by weight.

4. A shaped article comprising the binder composition of claim 1.

5. The composition of claim 1, wherein the triazine is that of melarnine and the alkoxylated resin includes alkoxy group s having at least 2 carbon atoms.

6. The composition of claim 1, wherein the triazine is a (lower) alkoxylated melamine-formaldehyde resin which by sealed mode differential scanning calorimetry for a sample essentially composed of 90 parts of the novolac and 10 parts, by weight, of the alkoxylated resin has at least 50% of its caloric exotherm at a temperature of at least 200° C.

7. The composition of claim 1, wherein at least about 75% of the caloric exotherm is at a temperature of at least 200° C.

8. The composition of claim 1, which contains about 7% to 15% of the triazine based on the weight of the novolac.

9. The composition of claim 1, wherein the novolac is in a solution comprising a solvent and has a weight average molecular weight of not greater than 1000.

10. The composition of claim 9, wherein the solvent is a member selected from the group consisting of ethylene glycol, propylene glycol, diethylene glycol, liquid polyethylene glycol, triethylene glycol, glycerine, and benzyl alcohol, glycol ethers, and mixtures thereof.

11. The composition of claim 1, wherein the novolac resin has a weight average molecular weight of 1000 to 5000.

12. The composition of claim 1, where-in the composition is 7 to 15% by weight of the triazine based on weight of the novolac.

13. The composition of claim 1, wherein the alkoxylated resin includes alkoxy groups of butoxymethyl.

14. The composition of claim 1, wherein the triazine resin has a water solubility of less than 10% by weight at 24° C.

15. The composition of claim 1, wherein the friazine resin has at least about 4.8 alkoxymethyl groups per trizine ring.

16. The composition of claim 1, wherein the triazine resin has from about 4.3 to about 5.6 alkoxymethyl groups per triazine ring.

17. The composition of claim 1, wherein the triazine resin have a methylol content of about 5 to about 1.5 weight percent.

18. A binder composition comprising a mixture of a particulate phenolic novolac resin and a hardener, said hardener comprising: a (lower) alkoxylated triazine-formaldehyde resin prepared by reacting melamine or benzoguanamine with formaldehyde at a ratio of at least 4.3 moles of formaldehyde for each mole of melamine to produce a triazine-formaldehyde resin and subsequently (lower) alkoxylating the triazine-formaldehyde resin to produce a (lower) alkoxylated triazine-formaldehyde resin having from about 1.0 to 2.5 triazine rings per molecule and wherein the total number of carbon atoms of the alkoxy groups provides a water solubility of less than about 10% by weight at 24° C. for the (lower) alkoxylated triazine-formaldehyde resin, wherein sealed mode differential scanning calorimetry for a sample essentially composed of 90 parts of the novolac and 10 parts, by weight, of the alkoxylated resin has at least 50% of its caloric exotherm at a temperature of at least 200° C., wherein the quantity of the triazine is from about 3 to 20% based on the weight of the novolac, and wherein the triazine resin has at least about 4.3 alkoxymethyl groups per triazine ring.

19. The composition of claim 18, wherein the novolac is in powdered form and the alkoxylated resin includes alkoxy groups having at least 2 carbon atoms.

20. The composition of claim 18, wherein the novolac is dissolved in a solvent and the alkoxylated resin includes alkoxy groups having at least 2 carbon atoms.

21. The composition of claim 18, wherein the quantity of the triazine is from 7% to 15% based on the weight of the novolac.

22. The composition of claim 18, wherein the alkoxylated triazine-formaldehyde resin is that of melamine and such resin has from about 1.3 to 2.2 triazine rings per molecule.

23. The composition of claim 18, further comprising a spray dried resole.

24. The composition of claim 18, wherein at least 80% of the caloric exotherm is at a temperature of at least 200° C.

25. The composition of claim 18, wherein the triazine resin has at least about 4.8 alkoxymethyl groups per triazine ring.

26. The composition of claim 18, wherein the triazine resin has from about 4.3 to about 5.6 alkoxymethyl groups per triazine ring.

27. The composition of claim 18, wherein the weight average molecular weight of the novolac is from about 1,500 to 5,000 and the (lower) alkoxylated melamine-formaldehyde resin is a member selected from the group consisting of:

(1) a (lower) alkoxylated melamine formaldehyde resin having a degree of polymerization of about 1.75 and about 5.6 methoxymethyl groups per triazine ring;

(2) a (lower) alkylated melamine formaldehyde resin having a degree of polymerization of about 1.7 with about 5.6 alkoxymethyl groups per triazine ring wherein said groups are of about an equal number having methoxymethyl and butoxymethyl groups;

(3) a (lower) alkoxylated melamine formaldehyde resin having a degree of polymerization of about 1.8 with about 4.8 butoxymethyl groups per triazine ring; and (4) a (lower) alkoxylated melamine formaldehyde resin having a degree of polymerization of about 1.1 with about 2.9 methoxymethyl groups and 2.6 butoxymethyl groups per triazine ring.

28. A binder composition comprising a mixture of:

A. a phenolic novolac resin; and

B. a triazine resin having a water solubility of less than 15% by weight at 24° C. and a degree of polymerization of about 1 to 2.5, wherein the quantity of triazine resin is about 3 to about 20% based on the weight of the novolac, said triazine resin being a (lower) alkoxylated melamine-formaldehyde resin having a formaldehyde-:melamine ratio of at least about 4, wherein the triazine resin comprises a mixture of triazine compounds having a Formula I:

wherein each of $R_1$, $R_2$, $R_3$, $R_4$, $R_5$ and $R_6$ is independently a member of the group consisting of hydrogen, methylol and (lower) alkoxymethyl having a formula (A—O—CH$_2$)— wherein group A is alkyl of 1 to 6 carbon atoms;

and n is 0 or 1;

wherein when n is 0 about 75% to 95% of the $R_{1-6}$ groups are (lower) alkoxymethyl, and at about a 75% to 89% level of the alkoxymethyl groups the average such alkoxymethyl group has at least 2 carbon atoms in the group A and at about the 90% to 95% level of the alkoxymethyl groups, the average such alkoxymethyl group has at least 1 carbon atom in the group A;

wherein when n is 1, about 50% to 95% of the $R_{1-6}$ groups are alkoxymethyl and at about a 50% to 75% level of the alkoxymethyl groups the average such alkoxymethyl group has at least 2 carbon atoms in the group A and at about the 76% to 95% level of the alkoxymethyl groups, the average such alkoxymethyl group has at least 1 carbon atom in the group A.

29. The composition of claim 28, wherein the mixture of triazine compounds comprises triazine compounds where n is O and triazine compounds where n is 1.

30. A binder composition comprising a mixture of:

A. phenolic novolac resin; and

B. a triazine resin having a water solubility of less than 15% by weight at 24° C. and a degree of polymerization of about 1 to 2.5 wherein the quantity of triazine resin is about 3 to about 20% based on the weight of the novolac, said triazine resin being a (lower) alkoxylated melamine-formaldehyde resin having a formaldehyde-:melamine ratio of at least about 4, wherein the triazine resin comprises a triazine compound having a single triazine ring having at least about 4 alkoxymethyl groups.

31. The composition of claim 30, wherein the triazine resin further comprises a triazine compound having two triazine rings and having at Least about 5 alkoxymethyl groups.

* * * * *